United States Patent [19]

O'Hara et al.

[11] Patent Number: 4,988,585
[45] Date of Patent: Jan. 29, 1991

[54] LIQUID CATHODE ELECTROCHEMICAL CELLS HAVING INSURED ANODE TO TAB CONTACT

[75] Inventors: Thomas J. O'Hara, Bay Village; Alan D. Ayers, Westlake; Manuel R. Malay, Brunswick, all of Ohio

[73] Assignee: Eveready Battery Company, Inc., St. Louis, Mo.

[21] Appl. No.: 306,417

[22] Filed: Feb. 2, 1989

[51] Int. Cl.$^5$ .................................................. H01M 4/72
[52] U.S. Cl. ........................................ 429/66; 429/196; 429/242
[58] Field of Search ........................... 424/196, 242, 66

[56] References Cited

U.S. PATENT DOCUMENTS

| | | | |
|---|---|---|---|
| 2,542,576 | 2/1951 | Ruben | 429/66 |
| 3,907,593 | 9/1975 | Marincic | 429/242 X |
| 4,032,696 | 6/1977 | Urry | 429/101 |
| 4,054,726 | 10/1977 | Sauer et al. | 429/66 |
| 4,431,719 | 2/1984 | Urry | 429/196 X |
| 4,483,908 | 11/1984 | Zumerman | 429/196 X |

Primary Examiner—Stephen J. Kalafut
Attorney, Agent, or Firm—Virgil B. Hill

[57] ABSTRACT

Liquid cathode electrochemical cells have means for biasing a consumable metal anode against a separator and resultingly against a cathode collector. The biasing means contacts the active anode metal throughout the discharge of the cell.

39 Claims, 3 Drawing Sheets

LIQUID CATHODE ELECTROCHEMICAL CELLS HAVING INSURED ANODE TO TAB CONTACT

This invention relates to liquid cathode cells employing a consumable anode.

BACKGROUND OF THE INVENTION

Electrochemical cells employing liquid cathodes and high energy density anodes find use in many devices requiring high power and long service life. In some cell constructions, a cathode collector is disposed next to a cell housing. In contact with the cathode collector is a separator; and an anode is in contact with the other side of the separator. As the cell discharges, the anode is consumed. This can create a problem as space results between the anode and separator or the cathode collector and separator.

One solution to the problem is disclosed in U.S. Pat. No. 4,032,696. That patent discloses liquid cathode cells having at least two discrete anode bodies. A spring tab has biasing means and is in contact with a current collector on the anode bodies. As the cell discharges, the spring tab biases the anode bodies outwardly against the separator which in turn contacts the cathode collector.

Although this assembly was an improvement over previous assemblies, the cells frequently exhibited a sudden voltage drop. This problem resulted from loss of electrical contact between the spring tab and anode. The anode current collector typically employed is a metal screen or grid having relatively small openings of generally less than about 0.08 inches measured lengthwise to establish uniform pliable contact along the complete surface of the anode. The spring tab would remain in contact with the anode current collector, but the voltage drop would still occur due to the formation of an insulative passivation layer on the anode current collector, which is formed on the exposed portion of the anode current collector upon contact with the cathode-electrolyte. This layer is desirable, because it prevents the self discharge of the anode and liquid cathode. However, as the normal discharge reaction proceeds and the anode is consumed, the spring tab can shift along the anode current collector and can become in contact with a passivated portion of the anode current collector. Thereby, electrical contact will be lost.

The loss of electrical contact phenomenon can occur in greater than 35% of cells. To measure this phenomenon, cells are discharged to a cutoff voltage, and the time to cutoff is measured. In a given sample of cells, a large standard deviation indicates a high occurrence of loss of contact. For example, a sample of 25 cells which are discharged at 250 ohms to a cutoff voltage of 2.7 volts has a mean time of 4377 minutes, a maximum time of 4947 minutes and a minimum time of 3310 minutes. The standard deviation is 499 minutes, which indicates a variation in the discharge time of about ±34% of the mean discharge time. That is, the discharge time can be expected to vary by 68%. In a sample of 25 cells which are discharged at 250 ohms to a cutoff voltage of 1.8 volts, the mean time is 4874 minutes, the maximum time is 5543 minutes and the minimum time is 3619 minutes. The standard deviation is 525 minutes, which indicates a variation in the discharge time of about ±32% of the mean discharge time.

The problem of spring tab shift to passivated portions of the anode current collector cannot be solved by removal of the anode current collector. In addition to providing for the uniform collection of current for the anode, the anode current collector assists in the insertion of the spring tab, without the anode current collector, the spring tab will tear and gall the anode metal when the spring tab is inserted. Also, during deep discharge, continuity of contact would be lost.

In view of such disadvantages, it would be desirable to have electrochemical cells which employ a biasing tab contact and a consumable anode in which the tab would remain in electrical contact with the anode during discharge of the cell.

SUMMARY OF THE INVENTION

This invention is an electrochemical cell comprising a container which has disposed therein a cathode collector, a separator, a liquid cathode-electrolyte, an active metal anode which is consumable during discharge of the cell, a means for collecting current from the active metal anode, and a means for biasing the active metal anode and current collecting means radially outward. The cathode collector is disposed proximate to the interior wall of the container, and the separator is disposed within and in surface contact with the cathode collector. The active metal anode is disposed within and in contact with the separator. The anode current collecting means is disposed within and in contact with the active metal anode and has means for exposing a portion of the active metal anode to direct contact with the biasing means. The biasing means is disposed within the anode current collector means and in contact with the exposed portion of active metal anode. This contact between the biasing means and exposed portion of the anode is maintained substantially completely during discharge of the cell.

In another aspect, this invention is an electrochemical cell comprising:

(a)(i) an anode comprising an active metal consumable during discharge of the cell and a means for collecting current for the anode;

(ii) a cathode collector; and (iii) a liquid cathode-electrolyte;

(b) a cell housing containing the anode, cathode collector, and electrolyte wherein the cathode collector is disposed proximate to the interior wall of the housing;

(c) a separator disposed within and in surface contact with the cathode collector, and about and in surface contact with the active metal of the anode:

(d) a means for biasing the anode against the separator, said means being in contact with the active metal of the anode.

The anode further comprises a means for maintaining contact between the active metal and biasing means during discharge of the cell.

In yet another aspect, this invention is a method for manufacturing an electrochemical cell comprising disposing a cathode collector proximate to an interior wall of a cell housing. A separator is disposed within and in contact with the cathode collector. An active metal anode which is consumable during discharge of the cell is disposed within and in contact with the separator. A means for collecting current is disposed within and in contact with the active metal anode. A means for biasing the active metal anode against the separator is disposed within and in contact with the anode. A means for allowing contact between the biasing means and active metal anode effectively continuously throughout discharge of the cell is provided by the anode current collector means.

In still yet another aspect, this invention is an electrochemical cell comprising a container having disposed therein a cathode collector, a separator, a liquid cathode-electrolyte, an active metal anode, an anode current collector and a spring tab. The cathode collector is disposed in contact with the container wall, the separator is in contact with the cathode collector, the active anode is in contact with the separator and the anode current collector is disposed on the surface of the active anode and in contact therewith. A portion of the active anode metal extends beyond the thickness of the anode current collector to provide an exposed anode portion The spring tab is disposed in contact the exposed portion of active metal anode, and the spring tab braces the active metal anode radially outwardly against the separator. The liquid cathode-electrolyte is disposed in contact with the active metal anode, separator and cathode collector. The contact between the spring tab and active metal anode is maintained throughout the discharge of the cell.

This invention provides liquid cathode electrochemical cells which have insured anode and spring tab contact throughout substantial discharge of the cell. As the cell discharges and the anode is consumed, the biasing tab remains in contact with the anode via the anode contacting means. Sudden voltage drop in the cells of this invention is substantially reduced.

DETAILED DESCRIPTION OF THE INVENTION

More specifically, an electrochemical cell in accordance within this invention could comprise an electrically conductive container closed at one end and open at the other end; a cathode collector disposed within and in surface contact with said container so as to adapt said container as the first terminal of the cell; a separator disposed within and in surface contact with said cathode collector; an anode in the form of at least two discrete bodies disposed within said separator; a means for collecting current disposed on the surface of each discrete anode body, said means having additional means for exposing a portion of the anode to direct contact with the biasing means; means for resiliently biasing said anode bodies outward into surface contact with said separator which in turn contacts said cathode collector thereby effectively maintaining physical contact between the anode, separator and cathode collector interfaces during discharge of the cell, said biasing means being in contact with said exposed portion of said anode; and cathode electrolyte disposed within and in contact with said cathode collector and in contact with said anode; a cover for said container; an insulating member interposed between said cover and the top inner wall of said container providing a means for sealing the cell between said cover and said container; and said anode and said cover having means for electrically connecting with each other so as to adapt said cover as the second terminal of the cell.

If desired, the cell's container could be made from a plastic tube with metal bottom and top closures and an inner metal liner, said metal liner being employed to provide contact with the cathode collector shell and the bottom metal closure. A separator (electronically insulating material) could be disposed between the inner wall of the container or the metal liner within the container and the cathode collector whereupon the cathode collector could then be electrically connected to the cover of the cell thereby adapting it as the positive terminal of the cell while the centrally disposed anode could be electrically connected to the container or the metal liner within the container thereby adapting it as the negative terminal of the cells.

As used herein and as desired in an article titled "Electrochemical Reactions in Batteries" by Akiya Kczawa and R. A. Powers in the Journal of Chemical Education—Vol. 49, pages 587 to 591. September 1972 issue, a cathode (positive electrode) is a reactant material that is electrochemically reduced on discharge of the cell. A cathode collector is not an active reducible or oxidizable material and functions as a current collector (electrical conductor) to the cathode for a cell.

The cathode collector in addition to functioning as the current collector must also serve as extended area reaction sites for the cathodic electrochemical process of the cell. Thus the cathode collector should have porosity with preferably at least 50% interconnected voids for providing increased access to reaction sites and be of a material capable of catalyzing or sustaining the cathodic electrochemical process. Materials suitable for use as a cathode collector are carbon materials and metals, such as nickel. Acetylene black is the preferred cathode collector. In addition to the above characteristics, the cathode collector when made of a particulate material should be capable of being molded directly within the cell container or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials Suitable binder materials for this purpose may include polyvinyl, polyethylene, polypropylene, acrylics, polystyrene and the like. Polytetrafluoroethylene would be the preferred binder for cathode collectors for use with liquid oxyhalide cathodes The binder, if required, should be added in an amount between about 5% and about 30% by dry weight of the molded cathode collector since an amount less than 5% would not provide sufficient strength to the molded body while an amount larger than 30% would wet-proof the surface of the carbon and/or reduce the available surface of the carbon, thereby reducing the activation site areas required for the cathodic electrochemical process of the cell. Preferably, the binder should be between 8% and 15% by weight of the cathode collector. Of importance in selecting the materials for the cathode collector is to select materials that will be chemically stable in the cell system in which they are to be used.

The anode materials for use in this invention can be any of the anodic materials known in the art which are consumed during the electrochemical reaction Preferably, they can be fabricated into discrete bodies, such as arcuate bodies, rectangular bodies, or cylindrical bodies of less than 360°.

As used herein an arcuate body shall mean an arc segment of a generally cylindrical shape, preferably ranging from about a 90° arc segment to below about a 180° arc segment depending on the number of arc segments employed in the cell. For example, when two arc segments are used, then each could range from about a 140° arc segment to below about a 180° arc segment while when employing three arc segments, then each could range from about a 90° arc segment to below about a 120° arc segment. As used herein a generally cylindrical spring member shall mean a coiled spring having one or more turns or an arcuate spring segment of less than 360°.

Examples of suitable anodes for use in nonaqueous cells would include lithium, sodium, calcium, magnesium, lithium monoaluminide and lithium-magnesium alloy.

Examples of suitable anodes for aqueous cell systems would include aluminum, magnesium, zinc and cadmium.

The biasing means suitable for use in this invention could be any spring means which will exert a resilient bias against the anode current collector and the anode when assembled in a cell. Although the biasing means preferably contacts both the anode and anode current collector, all that is required is that it contact the portion of anode exposed through the anode current collector. Thereby, the biasing means provides continuous physical contact between said anode and the separator, and thus between the separator and the cathode collector, and finally between the cathode collector and the container of the cell throughout the discharge of the cell. Thereby, a low internal cell resistance is maintained throughout the life of the cell.

Preferably, a conductive spring tab member made of a material such as nickel, stainless steel, or Inconel (a trademark for a corrosion-resisting alloy containing 76% Ni, 15% Cr and 9% Fe) could be employed as a means for electrically connecting the anode to the negative terminal of the cell while also functioning as the resilient biasing means for mechanically forcing the anode bodies radially outward against the separator in the cell. This could be accomplished, for example, by using a conductive "U" shaped or coiled spring member which can be squeezed and inserted between or into a space defined by the anode whereupon the expansion of the spring member will provide continuous electrical pressure contact to the anode while also resiliently biasing the anode against the separator which in turn contacts the cathode collector of the cell which itself can be in contact with the inner surface of the cell's container. An extended end or leg of the "U" shaped spring member, if conductive, could be secured in a conventional manner to the cover or container of the cell thereby adapting the cover or container as the negative terminal of the cell. In another embodiment, a separate conductive strip, such as nickel strip, could be secured at one end to the "U" shaped or coiled spring member and the other end of the strip could be secured to the cover or container of the cell so as to adapt the cover or container as the negative terminal of the cell.

The means for collecting current for the anode can be any material which can establish surface contact and is electrically conductive. The means for collecting current provides uniform current distribution over the anode. This will result in a substantially uniform consumption or utilization of the anode while also providing a substantially uniform spring pressure over the inner wall surface of anode as will be discussed below. Examples are split metal foils, perforated metal sheets, expanded metal grids or metal screens. The means for exposing the anode to contact with the biasing means can be, for example, openings in the grid or screen large enough to permit exposure of the anode through the openings, distinct current collecting sections, isolated extrusions of anode through the metal screen or grid, and placing a strip of anode material on the surface of the current collector opposite the anode so that a portion of the current collector is sandwiched between two distinct portions of the anode. Thus, electrical contact between the anode and biasing spring tab is maintained during discharge of the cell.

In the large opening embodiment, the size of the openings in the grid or screen will vary according to the size of the anode. Generally, the openings are large enough to allow embedding into the anode and yet small enough to establish uniform current collecting contact along the complete surface of the anode. Typically, for a cell with external dimensions of 0.475 inch diameter, and 1.6 inches in height, the openings can range from about 0.100 inch to about 0.284 inch measured lengthwise, and preferably from about 0.125 inch to about 0.200 inch.

In another embodiment, at least two distinct anode current collector sections can be employed. In this embodiment, the separate sections are spaced apart from one another to provide a space of exposed active anode metal. Preferably, this opening is at the bottom half of the anode with the top being toward the open end of the container. This exposed portion can then contact the biasing means directly. In this embodiment, a metal grid or screen having even small openings, or a metal foil can be employed since the anode contacts the spring tab at the exposed portion.

In yet another embodiment, at least one isolated extrusion of the anode metal through the anode current collector can be employed. In this embodiment, the biasing means contacts the anode metal at the isolated extrusion. Preferably, this isolated extrusion is at the bottom half of the anode with the top being toward the open end of the container. A metal screen or grid having smaller openings relative to the large opening embodiment discussed above can be used in this embodiment.

In still yet another embodiment, an isolated piece of anode can be placed on the surface of the anode current collector opposite the anode such that a portion of the anode current collector is sandwiched between anode material. A metal grid or screen can have very small openings in this embodiment.

The cathode-electrolytes useful in this invention are liquid active reducible cathode materials and usually are mixed with a conductive solute which is an electrochemically non-reactive material It is added to improve conductivity of the liquid active reducible cathode materials. Alternatively, the liquid cathode-electrolyte materials can be mixed with both a conductive solute and an electrochemically reactive or non-reactive co-solvent material The cathode-electrolytes useful in this invention are electrolyte solvents which perform the dual function of acting as solvent for an electrolyte salt and as the active cathode material of the cell.

In assembling the cell, a liquid cathode-electrolyte could be placed into the cavity defined by the anode where it flows around the anode and then permeates through the separator to contact the cathode collector of the cell. Alternatively or in addition, the separator could be soaked with the liquid cathode-electrolyte prior to being assembled in the cell. Thus the cavity defined by the anode could be used as a reservoir for the cathode-electrolyte. In one embodiment of this invention, the cathode collector is in the form of semi-cylindrical members having a longitudinal groove imparted in their outer surfaces that face the internal wall of the container so as to provide reservoirs for the cathode-electrolyte of the cell.

Suitable nonaqueous cathode-electrolyte materials for use in this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 63rd Edition. The CRC Press Inc., Boca Raton, Fla. 1982-1983. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode-electrolyte material would be liquid sulfur dioxide.

It has been found that in nonaqueous cell systems using oxyhalide cathode-electrolyte solutions, the cathode collector should be about 75% to 85% porous and its thickness is determined by the rate capability desired and the cell size. If the cathode collector is too thick, active employs an axially disposed cylindrical cathode collector having a maximum thickness of about 0.150 inch (0.381 cm). In this invention, preferably the cathode collector is in the form of a cylindrical tube and is disposed radially outward of the anode. In addition, the thinner the cathode collector for a given outside diameter of a cylindrical cell, the greater the diameter of the anode and the lower the electrode current density on discharge. This lower electrode current density results in greater efficiency of anode utilization and less tendency of the anode to passivate. Thus in the present invention wherein the outermost active member of the cylindrical cell is the cathode collector then considering the cross section of the cell, the cathode collector can be fabricated with the thinnest cross section for a given volume of material. The same amount of cathode collector material in an axially disposed cathode collector cell embodiment would result in a cathode collector having a significantly thicker wall dimension than the cathode collectors usable with this invention. Additional advantages of the cathode collector useful in the present invention is that the cathode collector is easier to manufacture since it is supported by the container's wall thereby requiring less binder and thus providing more reaction sites, i.e., sites not masked by the binder.

Suitable liquid cathode-electrolyte materials for use in aqueous cell systems include aqueous solutions of persulfate, peroxide, permanganate and chromic acid.

Some preferred combinations of nonaqueous cathode-electrolyte materials and anodes would be as follows:

1. sulfuryl chloride/Li or Na;
2. thionyl chloride/Li or Na;
3. phosphorus oxychloride/Li or Na;
4. Sulfur monochloride/Li or Na;
5. sulfur monobromide/Li or Na;
6. selenium tetrafluoride/Li or Na.

Most preferred is the combination of thionyl chloride and lithium. Some preferred combinations of soluble cathode-electrolyte materials and anodes for aqueous cell systems would be a zinc, magnesium or aluminum anode in an aqueous solution of persulfate or chromic acid.

The solute for use in the cathode-electrolyte can be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 293-313 by G. N. Lewis).

A suggested reaction mechanism for the manner in which these complexes function in a solvent is described in detail in U.S. Pat No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, and potassium bromide.

The double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, a cosolvent may be added to the liquid active reducible cathode and solute solution to alter the dielectric constant, viscosity or solvent properties of the solution to achieve better conductivity. Some examples of suitable cosolvents are nitrobenzen, tetrahydrofuran, 1,3-dioxolane, 3-methyl-2-oxazolidone, propylene carbonate, gamma-butyrolactone sulfolane, ethylene glycol sulfite, dimethyl sulfite, dimethyl sulioxide, benzoyl chloride, dimethoxyethane, dimethyl isoxazole, diethyl carbonate, and the like.

The separator for use in this invention can be made from a wide variety of materials, such as glass, plastics, cellulose, starch, etc. It can be in the form of swellable coatings on paper, swellable films such as cellulose in aqueous solutions, woven or felted papers, perforated sheets or combinations of the foregoing.

The separator has to be chemically inert and insoluble in the cell system and should have a porosity sufficient to permit the liquid cathode-electrolyte to flow around and contact the anode, thus establishing an ion transfer path between the anode and cathode collector. Suitable separators for use with liquid oxyhalide cathode-electrolyte are the non woven glass separators, preferably those separators that incorporate long glass fibers along with the short glass fibers since such a combination increases the tear strength of the separators thereby making them easier to handle.

Suitable separators for use with aqueous cell systems for example are starch or methyl cellulose on felted paper, cast cellulose film, gelled wheat starch or flour pastes, felted or woven fibers of plastic such as nylon polyethylene, etc. or porous cast vinyl polymer sheets.

The container and cover for use in this invention can be stainless steel, iron, nickel, nickel-plated steel, plastic or some other material that will not corrode or otherwise deteriorate when in contact with the ceil materials. Preferably in the case of the liquid oxyhalide cathode system, the container and cover could be made of 304 stainless steel which has been heat treated to release the inherent stresses introduced during conventional drawing operations, or nickel.

The insulating member disposed between the cover and the can has to be stable in the presence of the cell components and can be selected from such materials as polytetrafluoroethylene (e.g., "Teflon"), fluorinated ethylene propylene polymer (e.g., FEP), ethylene-copolymer with FFP (e.g., "Tefzel"). polychlorotrifluoroethylene (e.g., "Kel F"), perfluoro-alkoxy polymer (e.g., PFA), polyvinyl, polyethylene, polystyrene etc.

Figure 1:
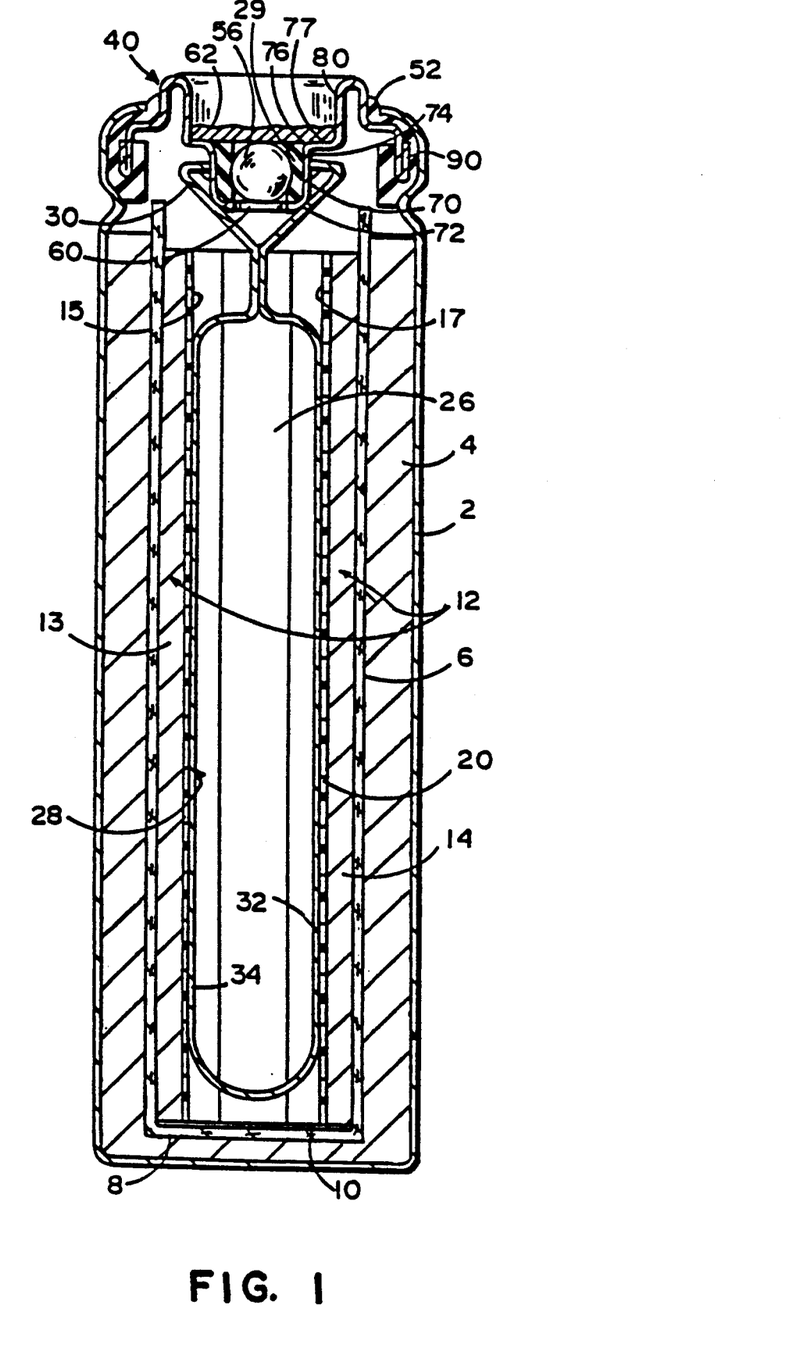
FIG. 1 illustrates an electrochemical cell employing one embodiment of an anode current collector useful in this invention.

The electrochemical cells can be assembled by first inserting the cathode collector into the cell container. A separator is then inserted within and in contact with the cathode collector. Next, the anode metal can be inserted alone or in combination with the anode current collector. The biasing spring tab and vent/cover are then added, and then the cathode-electrolyte is added to complete the cell system. The cell is finally completed by closing and sealing it by conventional methods. A preferred sealing means has means for releasing pressure and/or electrolyte upon experiencing an undesirable increase in pressure or temperature. Examples are areas in the cell covered designed to vent at a predetermined pressure. A preferred venting means is a sealing/venting well disposed in the cover. The sealing/venting well has a support ledge at its bottom which defines a sealing/venting well orifice. A vent liner is placed in the well in an interference fit with the walls of the sealing/venting well. The vent liner also defines an orifice so that a pathway from the interior of the cell to the atmosphere is provided by the support ledge orifice and vent liner orifice. A seal member is force fitted into the vent liner orifice, and can be expelled from the sealing/venting well upon an effective increase in the internal pressure of the cell. Such a cover is depicted in FIG. 1, and is disclosed in copending U.S. patent application Ser. No. 102,814, now U.S. Pat. No. 4,931,368 herein incorporated by reference.

Referring to FIG. 1 showing a preferred cell construction containing a vent, cylindrical cover 40 comprises a circular cover orifice 60, vent liner containment section 70, annular cap section 80 and circumferential cover flange 90. Vent liner containment section 70, which contains vent liner 29, comprises circumferential support ledge 72. which is integrally joined to sealing well 74 at the bottom of sealing well 74. Support ledge 72 is inwardly directed throughout its circumference toward the geometric axis of sealing well 74, thereby defining cover orifice 60. Rounded containment section shoulder 76 is located at the intersection of the top of sealing well 74 and cover ledge 77, the latter being the horizontal surface spanning the area between shoulder 76 and cap section 80. Rounded containment section shoulder 76 provides a smooth transition at that intersection without sharp edges. The cover is tightly sealed by conventional closing methods to container 2 with insulating gasket 52 therebetween. Seal member 56 is inserted within vent liner 29 and sealant layer 62 is disposed over seal member 56. At a predetermined gas pressure within the cell, seal member 56 will be at least partially expelled from within vent liner 29. Cylindrical container 2 has disposed therein a cathode collector shell 4 in contact with the inner upstanding circumference of the container 2 thereby adapting the container as the cathodic or positive terminal for the cell. Disposed within and in contact with the inner circumference of cathode or cathode collector 4 is a separator liner 6 with its bottom end 8 radially folded inward and supporting a bottom separator or disc 10. If desired, the cathode collector material could be extruded within the container 2, rolled with the can material or composed of one or more segments to form a cylindrical tube and then placed in the container.

A two member anode 12 is shown in FIG. 1 comprising a first half, half annular member 13 and a second half, half annular member 14.

If desired, arcuate type backing sheets 15 and 17, such as inert electrically conductive metals screens or grids, could be disposed against the inner surface wall of the anode bodies 13 and 14 respectively.

Grids 15 and 17 are embedded in anode members 13 and 14 respectively and have openings sufficiently large to expose anode portions 20 to contact with conductive spring tab 28.

An electrically conductive spring tab 28 is appropriately bent into a flattened elliptically shaped member having an extending end 30. When inserting the spring tab 28 into a container, the legs 32, 34 of the conductive strip tab 28 are squeezed together and forced into the axial opening between the two screen backed anode members arranged in a container as shown in FIG. 1. The inserted conductive spring tab 28 resiliently biases the two anode members 13 and 14 via backing screens 15 and 17 so as to provide a substantially uniform and continuous pressure contact over the inner wall of the anode members. The extended end 30 of spring tab 28 is shown projected above the surface of anode members 13 and 14, and is snapped onto sealing well 74, thereby adapting cover 40 as the anodic or negative terminal of the cell. Before closing the cell, the cathode-electrolyte can be dispensed in opening 26 whereupon it can flow around the anode, permeate through the separator and the cathode collector of the cell. In addition, the separator could be presoaked with the cathode-electrolyte prior to being inserted into the cell.

Figure 2A:
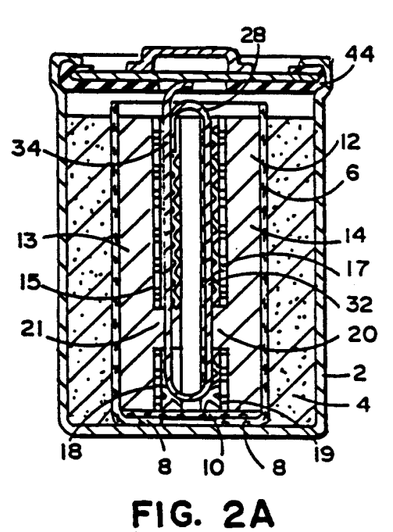
FIG. 2a illustrates an electrochemical cell employing another embodiment of an anode current collector in two distinct parts useful in this invention.

In FIG. 2a, an electrochemical cell is shown which comprises cylindrical container 2 having disposed therein cathode collector 4. In various figures herein, like numerals refer to like components. Cathode collector 4 is proximate to and in contact with the interior wall of container 2, thereby adapting the container as the cathodic or positive terminal of the cell. A separator 6 is disposed within and in contact with cathode collector 4, and has a bottom end 8 folded radially inward and supporting a bottom separator or disc 10.

A two member active metal anode 12 comprises first portion 13 and second portion 14. Anode 12 is disposed within and in contact with separator 6.

Anode current collectors 15 and 17 are in contact with anode members 13 and 14 respectively, and anode current collectors 18 and 19 are in contact with anode portions 13 and 14 respectively.

Electrically conductive spring tab 28 has extending legs 32 and 34. Extending leg 32 contacts anode collector portions 17 and 19, and extending leg 34 contacts collector portions 15 and 18. The extending legs 32 and 34 are resilient and bias anode members 13 and 14 against separator 6. Also, extending leg 32 contacts anode member 14 at point exposed portion 20, and extending leg 34 contacts anode member 13 at exposed portion 21.

Figure 2B:
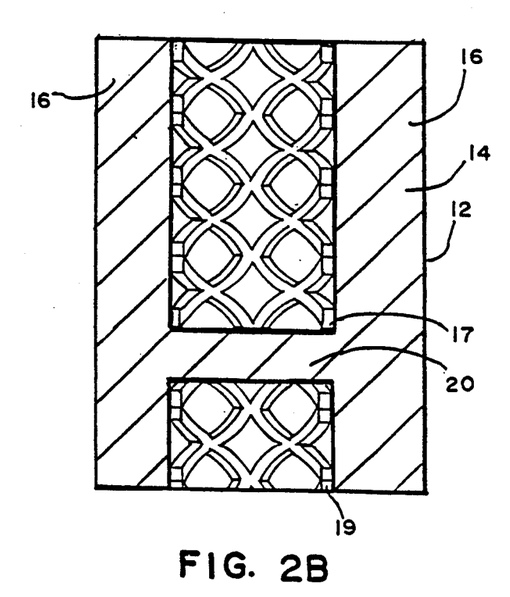
FIG. 2b illustrates separately from the cell an active metal anode and anode current collector split in two distinct parts useful in the cells of this invention.

In FIG. 2b, anode portion 14 of anode 12 has flat end faces 16. Current collector portion 17 is distinct from portion 19 and leaves anode portion 14 exposed at area 20.

Figure 3A:
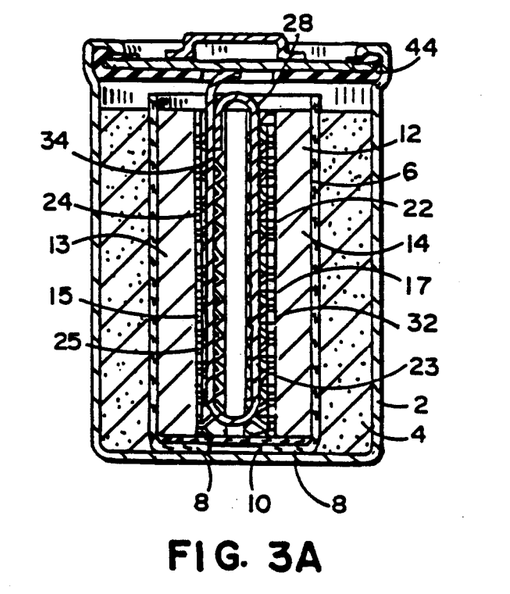
FIG. 3a illustrates an electrochemical cell employing yet another embodiment of an anode current collector useful in this invention.

In FIG. 3a, an electrochemical cell is shown having similar elements to the cell shown in FIG. 2a. However, in FIG. 3a, current collectors 15 and 17 are one piece in contact with anode members 13 and 14 respectively. Anode portion 14 and collector 17 have isolated anode extrusions 22 and 23. Leg 32 of spring tab 28 contacts extended anode portions 22 and 23. Anode portion 13 and collector 15 have isolated anode extrusions 24 and 26. Leg 34 of spring tab 28 contacts extended anode portion 24 and 25.

Figure 3B:
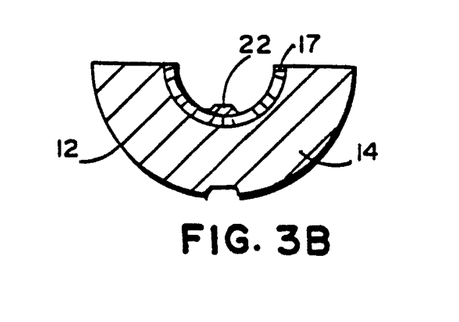
FIG. 3b, c and d illustrate separately from the cell an active metal anode and anode current collector having isolated active metal anode extrusions.

In FIG. 3b, an end view of anode 12 shows anode member 14, having collector 17 in surface contact therewith. Isolated extrusion 22 of anode member 14 extends above collector 17.

Figure 3C:
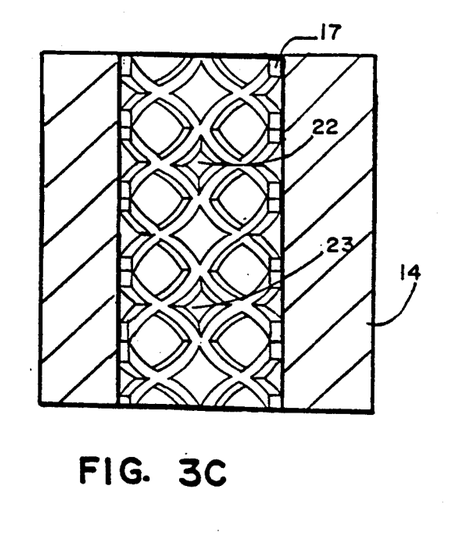

In FIG. 3c, a front view of anode 12 shows collector 17 in surface contact with anode member 14. Two isolated extrusions 22 and 23 expose portions of anode member 14.

Figure 3D:
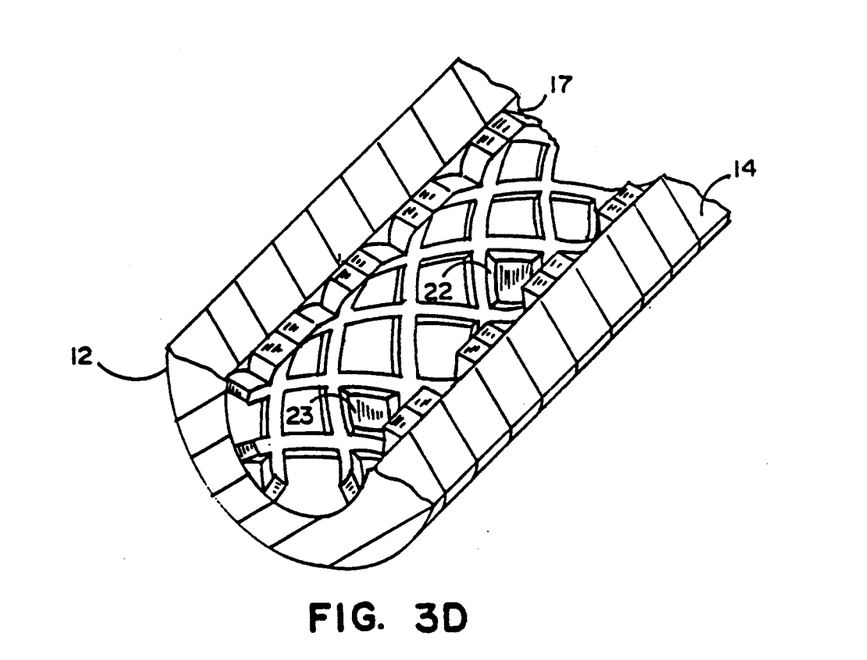

In FIG. 3d, a three-dimensional view of anode member 14 is shown. Again, anode current collector 17 is in contact with anode member 14, and isolated extrusions 22 and 23 expose anode member 14.

The following examples illustrate the effectiveness of avoiding loss of spring/anode contact in the cells of the present invention. These results do not limit the scope of the invention.

EXAMPLE 1

Electrochemical cells are constructed similar to the construction shown in FIG. 1. The cell container is 304 stainless steel and is 1.600 inches in height and 0.475 inch in diameter. A cathode collector of 90% by dry weight acetylene black and 10% Teflon binder is added with enough water to render the mix moldable to the container. The mixture is dried by heating to provide a cylinder of cathode collector on the inner surface of the container. A tubular nonwoven separator is inserted next to the surface of the cathode collector. Two distinct anode members of 1.65 gm. each of lithium are disposed next to the separator so that a central cavity is defined Expanded nickel grids having openings of 0.125 inch measured lengthwise are placed on the surface of and embedded into the anode so that some of the lithium extends beyond the thickness of the anode current collector. A spring tab attached to a sealing/venting well in the cover is inserted into the cavity so that the spring tab legs are biasing against the nickel grid and two anode members. A cathode-electrolyte solution (3.88 gm.) of 1.5 M $LiAlCl_4$ in thionyl chloride is introduced into the cell, and a glass seal member is inserted into the sealing/venting well to seal the cell. The cell has a rated capacity of 1 ampere/hour, an open circuit voltage of 3.67 volts, a beginning closed circuit voltage of 3.32 volts and an average operating voltage of 3.45 volts.

Twenty cells are discharged on a continuous drain of 250 ohms to a cutoff voltage of 2.7 volts. The mean time to cutoff is 4594 minutes, the maximum is 5006 minutes and the minimum is 4260 minutes. The standard deviation is 174 minutes. This indicates a variation in discharge time of the mean discharge time of about ±11.4%.

EXAMPLE 2

Twenty cells assembled according to Example 1 are discharged over a continuous drain of 250 ohms to 1.8 volt cutoff. The mean time to cutoff is 5074 minutes, the maximum is 5316 minutes and the minimum is 4683 minutes. The standard deviation is 195 minutes. This indicates a variation in discharge time of about ±11.5%.

EXAMPLE 3

Electrochemical cells are assembled according to the method described in Example 1 except that a nickel grid having openings of 0.189 inch measured lengthwise is employed as the anode current collector. Twenty cells are discharged on 250 ohms continuous drain to 2.7 volt cutoff. The mean time is 4554 minutes, the maximum is 4769 minutes and the minimum is 4269 minutes. The standard deviation is 114 minutes. This indicates a variation in the discharge time of about ±7.5%.

Twenty cells are discharged on a continuous drain of 250 ohms to 1.8 volts. The mean time is 4998 minutes, the maximum is 5253, and the minimum is 4700 minutes. The standard deviation is 153 minutes. This indicates a variation in the discharge time of about ±9.2%.

EXAMPLE 4

Electrochemical cells are prepared according to Example 1 except that a two piece nickel grid having openings of 0.077 inch measured lengthwise is employed as the anode current collector. A portion of anode material is exposed between the two pieces of anode collector at the bottom half of the anode, with the top being toward the open end of the container.

Fifteen cells are discharged on a 250 ohms continuous drain to a cutoff of 2.7 volts. The mean time is 4446 minutes, the maximum is 4914 and the minimum is 4134. The standard deviation is 204 minutes. This indicates a variation in the discharge time of about ±13.8%.

Fifteen cells are discharged on a 250 ohm continuous drain to a cutoff of 1.8 volts. The mean time is 4822 minutes, the maximum is 5168 and the minimum is 4497. The standard deviation is 201 minutes. This indicates a variation in the discharge time of about ±12.5%.

EXAMPLE 5

Electrochemical cells are constructed according to Example 1 except that a nickel grid having openings of about 0.077 inch measured lengthwise is used as the anode current collector and there is a single extrusion of anode extending beyond the thickness of the current collector in the bottom half of the anode. The top of the anode is the end disposed proximate to the open end of the container.

Twenty-four cells are discharged on a 250 ohm continuous drain to a cutoff 2.7 volts. The mean time is 4171 minutes, the maximum is 4320 minutes and the minimum is 4011 minutes. The standard deviation is 87 minutes. This indicates a variation of about ±6.3%.

Twenty-four cells are discharge on a continuous drain to a cutoff of 1.8 volts. The mean time is 4031 minutes, the maximum is 5369 minutes and the minimum is 4818 minutes. The standard deviation is 152 minutes. This indicates a variation in the discharge time of about ±11.3%.

EXAMPLE 6

Electrochemical cells, are constructed according to Example 5 except that the extended anode portion is at the middle of the anode.

Twenty-four cells are discharged on a continuous drain of about 250 ohms to a cutoff of 2.7 volts. The mean time is 4432 minutes, the maximum is 4823 minutes, and the minimum is 4194 minutes. The standard deviation is 176 minutes, which indicates a variation in the discharge time of about ±11.9%.

Twenty-four cells are discharged on a continuous drain of 250 ohms to a cutoff of 1.8 volts. The mean time is 5105 minutes, the maximum is 5414 minutes and the minimum is 4749 minutes. The standard deviation is 169 minutes which indicates a variation in the discharge time of about ± 9.9%.

EXAMPLE 7

Electrochemical cells are constructed according to Example 1 except that a nickel grid having openings of 0.077 inch measured lengthwise is employed as the anode current collector and a piece of lithium is placed over the anode current collector at the middle of the anode.

Twenty-four cells are discharged on a continuous drain of 250 ohms to a cutoff of 2.7 volts. the mean time is 4633 minutes the maximum is 5061 minutes and the minimum is 4218 minutes. The standard deviation is 218 minutes which indicates a variation in discharge time of about ± 14.1%.

Twenty-four cells are discharged on a continuous drain of 250 ohms to a cutoff of 1.8 volts. The mean time is 5009 minutes, the maximum is minutes and the minimum is 4532 minutes. The standard deviation is 289 minutes which indicates a variation of about ±17.3%.

Examples 4–7 illustrate that grids with smaller openings relative to the openings of the grids in Examples 1–3 can be used effectively if used along with an exposed portion, extended portion or an overlayed portion of anode.

What is claimed:

1. An electrochemical cell comprising a container having disposed therein a cathode collector, a separator, a liquid cathode-electrolyte, an active metal anode which is consumable during discharge of the cell, a means for collecting current for the active metal anode, and a means for biasing the active metal anode and current collecting means radially outward; wherein said cathode collector is disposed proximate to the interior wall of the container, said separator is disposed within and in surface contact with the cathode collector, said active metal anode is disposed within and in contact with the separator, said current collecting means is disposed within and in contact with the active metal anode, said anode current collecting means having means for exposing a portion of the active metal anode to direct contact with the biasing means and said biasing means is disposed within the anode current collecting means and in contact with the active metal anode.

2. The electrochemical cell of claim 1 wherein the current collecting means is an expanded metal grid having openings sufficiently large to expose the anode to direct contact with the biasing means.

3. The electrochemical cell of claim 2, wherein the current collecting means is an expanded metal grid having openings measured lengthwise of from about 0.100 inch to about 0.284 inch.

4. The electrochemical cell of claim 3, wherein the openings are between about 0.125 inch and 0.200 inch.

5. The electrochemical cell of claim 1, wherein the current collecting means is a metal grid of at least two distinct sections and said means for exposing a portion of the active metal anode to direct contact with the biasing means is an exposed portion of the anode between the sections of the grid.

6. The electrochemical cell of claim 1, wherein the anode current collecting means is a metal grid and said means for exposing a portion of the active metal anode to direct contact with the biasing means is at least one isolated extrusion of anode through a portion of the grid.

7. The electrochemical cell of claim 1, wherein the active anode metal is lithium, the cathode collector is carbon, and the liquid cathode-electrolyte comprises thionyl chloride.

8. The electrochemical cell of claim 2, wherein the active anode metal is lithium, the cathode collector is carbon, and the liquid cathode-electrolyte comprises thionyl chloride.

9. The electrochemical cell of claim 3, wherein the active anode metal is lithium, the cathode collector is carbon, and the liquid cathode-electrolyte comprises thionyl chloride.

10. The electrochemical cell of claim 4, wherein the active anode metal is lithium, the cathode collector is carbon, and the liquid cathode-electrolyte comprises thionyl chloride.

11. The electrochemical cell of claim 5, wherein the active anode metal is lithium, the cathode collector is carbon, and the liquid cathode-electrolyte comprises thionyl chloride.

12. The electrochemical cell of claim 6, wherein the active anode metal is lithium, the cathode collector is carbon, and the liquid cathode-electrolyte comprises thionyl chloride.

13. An electrochemical cell comprising:
   (a)(i) an anode comprising an active metal consumable during discharge of the cell and a means for collecting current for the anode;
   (ii) a cathode collector; and
   (iii) liquid cathode-electrolyte;
   (b) a cell housing containing the anode, cathode collector, and electrolyte wherein the cathode collector is disposed proximate to the interior wall of the housing, (c) a separator disposed within and in surface contact with the cathode collector, and about and in surface contact with the active metal of the anode; and (d) a means for biasing the anode against the separator, said means being in contact with the active metal of the anode, wherein the anode further comprises means for maintaining contact between the active metal and biasing means during discharge of the cell.

14. The electrochemical cell of claim 13, wherein the anode current collecting means is an expanded metal grid having openings sufficiently large to allow contact between the biasing means and anode through the openings.

15. The electrochemical cell of claim 14, wherein the current collecting means and said means for maintaining contact between the active metal and biasing means is an expanded metal grid having openings measured lengthwise of from about 0.100 inch to about 0.284 inch.

16. The electrochemical cell of claim 15, wherein the openings are between about 0.125 inch and 0.200 inch.

17. The electrochemical cell of claim 13, wherein the anode current collecting means is at least two distinct metal grid sections separated to provide an exposed portion of the active metal between the grid sections to establish the contact between the active metal and biasing means at that exposed portion.

18. The electrochemical cell of claim 13, wherein the anode current collecting means is a metal grid, which has at least one portion of active metal extending through the grid openings to establish the contact between the active meal and biasing means.

19. The electrochemical cell of claim 13, wherein the active anode metal is lithium, the cathode collector is carbon, and the liquid cathode-electrolyte comprises thionyl chloride.

20. The electrochemical cell of claim 14, wherein the active anode metal is lithium, the cathode collector is carbon, and the liquid cathode-electrolyte comprises thionyl chloride.

21. The electrochemical cell of claim 15, wherein the active anode metal is lithium, the cathode collector is carbon, and the liquid cathode-electrolyte comprises thionyl chloride.

22. The electrochemical cell of claim 16, wherein the active anode metal is lithium, the cathode collector is carbon, and the liquid cathode-electrolyte comprises thionyl chloride.

23. The electrochemical cell of claim 17, wherein the active anode metal is lithium, the cathode collector is carbon, and the liquid cathode-electrolyte comprises thionyl chloride.

24. The electrochemical cell of claim 18, wherein the active anode metal is lithium, the cathode collector is carbon, and the liquid cathode-electrolyte comprises thionyl chloride 25. An electrochemical cell comprising an electrically conductive container closed at one end and open at the other end; a cathode collector disposed within and in surface contact with said container so as to adapt said container as the first terminal of the cell, a separator disposed within and in surface contact with said cathode collector; an anode in the form of at least two discrete bodies disposed within said separator; a means for collecting current disposed on the surface of each discrete anode body, and said current collecting means having means for exposing a portion of the anode to direct contact with a biasing means; a means for biasing said anode bodies outward into surface contact with said separator which in turn contacts said cathode collector thereby effectively maintaining physical and ionic contact between the anode, separator, and cathode collector interfaces during discharge of the cell, said biasing means being in contact with said anode current collecting means and the exposed portion of said anode; and a cathode-electrolyte disposed within and in contact with said cathode collector and in contact with said anode; a cover for said container; an insulating member interposed between said cover and the top inner wall of said container providing a means for sealing the cell between said cover and container; and said anode and said cover having means for electrically connecting with each other so as to adapt said cover as the second terminal of the cell.

26. The electrochemical cell of claim 25, wherein the anode current collecting means is an expanded metal grid having openings sufficiently large to expose the anode to direct contact with the biasing means.

27. The electrochemical cell of claim 25, wherein the anode current collecting means is a metal grid of at least two distinct sections and said means for exposing a portion of the anode to direct contact with a biasing means is an exposed portion of the anode between the sections of the grid.

28. The electrochemical cell of claim 25, wherein the anode current collecting means is a metal grid and said means for exposing a portion of the anode to direct contact with a biasing means is at least one isolated extrusion of anode through a portion of the grid.

29. The electrochemical cell of claim 26 wherein the active anode metal is lithium, the cathode collector is carbon, and the liquid cathode-electrolyte comprises thionyl chloride.

30. The electrochemical cell of claim 27, wherein the active anode metal is lithium, the cathode collector is carbon, and the liquid cathode-electrolyte comprises thionyl chloride.

31. The electrochemical cell of claim 28, wherein the active anode metal is lithium, the cathode collector is carbon, and the liquid cathode-electrolyte comprises thionyl chloride.

32. The electrochemical cell of claim 25, wherein the active anode metal is lithium, the cathode collector is carbon, and the liquid cathode-electrolyte comprises thionyl chloride.

33. The electrochemical cell of claim 25, wherein said cover further comprises means for venting the cell at an increase in internal cell pressure 34. The electrochemical cell of claim 26, wherein said cover further comprises means for venting the cell at an increase in internal cell pressure.

35. The electrochemical cell of claim 27, wherein said cover further comprises means for venting the cell at an increase in internal cell pressure.

36. The electrochemical cell of claim 28 wherein said cover further comprises means for venting the cell at an increase in internal cell pressure.

37. The electrochemical cell of claim 32, wherein said cover further comprises means for venting the cell at an increase in internal cell pressure.

38. An electrochemical cell comprising a container having disposed therein a cathode collector, a separator, a liquid cathode-electrolyte, an active metal anode, an anode current collector, and a spring tab; wherein the cathode collector is disposed in contact with the container wall; the separator is in contact with the cathode collector; the active metal anode is in contact with the separator; the anode current collector is disposed on the surface of the active metal anode and in contact therewith, and wherein a portion of the active metal anode extends beyond the thickness of the anode current collector to provide an exposed anode portion; and wherein the spring tab is disposed in contact with the exposed portion of active metal anode, and biases the active metal anode radially outwardly against the separator; and the liquid cathode-electrolyte is disposed in contact with the active metal anode, separator and cathode collector.

39. The electrochemical cell of claim 38, wherein the contact between the spring tab and active metal anode is substantially maintained throughout the discharge of the cell.

* * * * *